(12) United States Patent
Davis

(10) Patent No.: US 9,848,541 B2
(45) Date of Patent: Dec. 26, 2017

(54) APPARATUS FOR TAPPING TREES

(71) Applicant: Eschol Davis, Ocilla, GA (US)

(72) Inventor: Eschol Davis, Ocilla, GA (US)

( * ) Notice: Subject to any disclaimer, the term of this patent is extended or adjusted under 35 U.S.C. 154(b) by 796 days.

(21) Appl. No.: 14/328,703

(22) Filed: Jul. 11, 2014

(65) Prior Publication Data

US 2015/0034209 A1 Feb. 5, 2015

Related U.S. Application Data

(60) Provisional application No. 61/844,872, filed on Jul. 11, 2013.

(51) Int. Cl.
*A01G 23/10* (2006.01)

(52) U.S. Cl.
CPC .................................. *A01G 23/10* (2013.01)

(58) Field of Classification Search
CPC .......... A01G 23/10; A01G 23/12; B27C 3/00; B27C 3/02; B27C 3/08; E21B 7/025; E21B 7/02; E21B 15/00; E21B 11/00; E21B 11/005; B23B 5/08; B23B 25/00; B23B 49/00; B23B 2270/022
USPC .................................................. 47/8, 10, 12
See application file for complete search history.

(56) References Cited

U.S. PATENT DOCUMENTS

| 1,620,371 | A | * | 3/1927 | Maddox | B27C 3/08 |
| | | | | | 408/135 |
| 2,434,089 | A | | 7/1944 | Allen | |
| 2,563,195 | A | | 8/1951 | Soule et al. | |
| 3,381,726 | A | * | 5/1968 | Apple | B27C 3/02 |
| | | | | | 408/111 |
| 3,967,687 | A | * | 7/1976 | Fowler | B28D 1/041 |
| | | | | | 173/32 |

* cited by examiner

*Primary Examiner* — Matthew G Katcoff
(74) *Attorney, Agent, or Firm* — Brian D. Bellamy

(57) ABSTRACT

An apparatus for tapping trees has a vertical support structure of posts that support upper and lower horizontal members extending from the vertical structure. The upper horizontal member provides a support for bearing against a tree trunk, and the lower horizontal member supports a combination of a drill block with a drill and a tap press. Forward and rearward movement of the drill block is operated by a motor, shafts and gears to drive a suspension member toward the tree trunk along travel rods and then reverse. A drive chain engaged with the gears is attached to the suspension member and incorporated in the front and rear blocks that support the travel rods and sprockets for the chain. The tap press is attached to the drill block and rotates from vertical to horizontal position and holds a tap cylinder for insertion into a tree trunk.

1 Claim, 3 Drawing Sheets

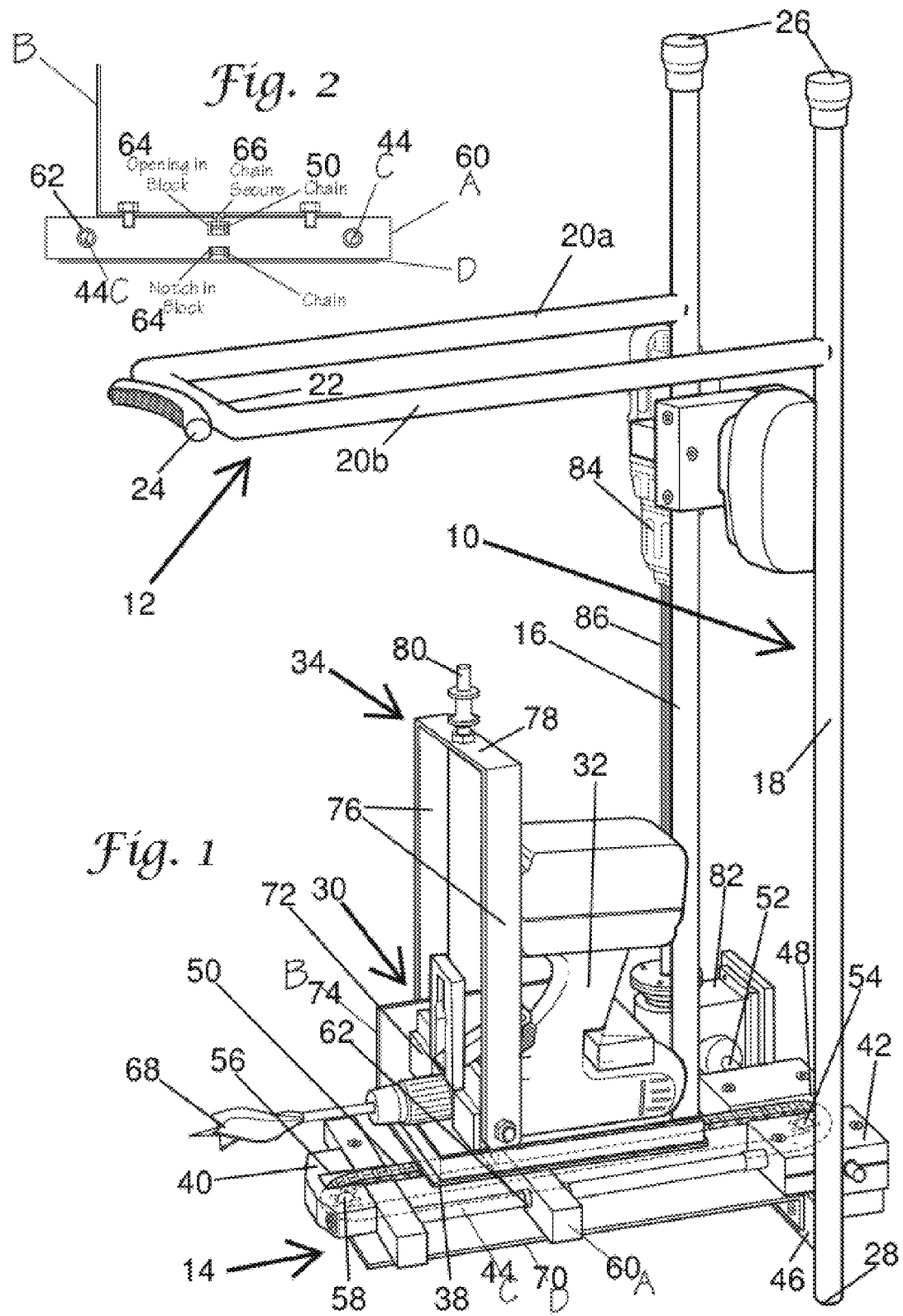

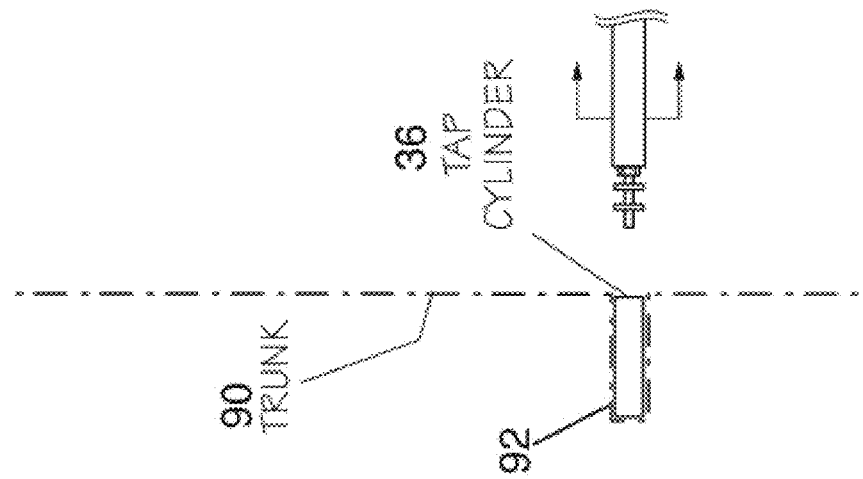
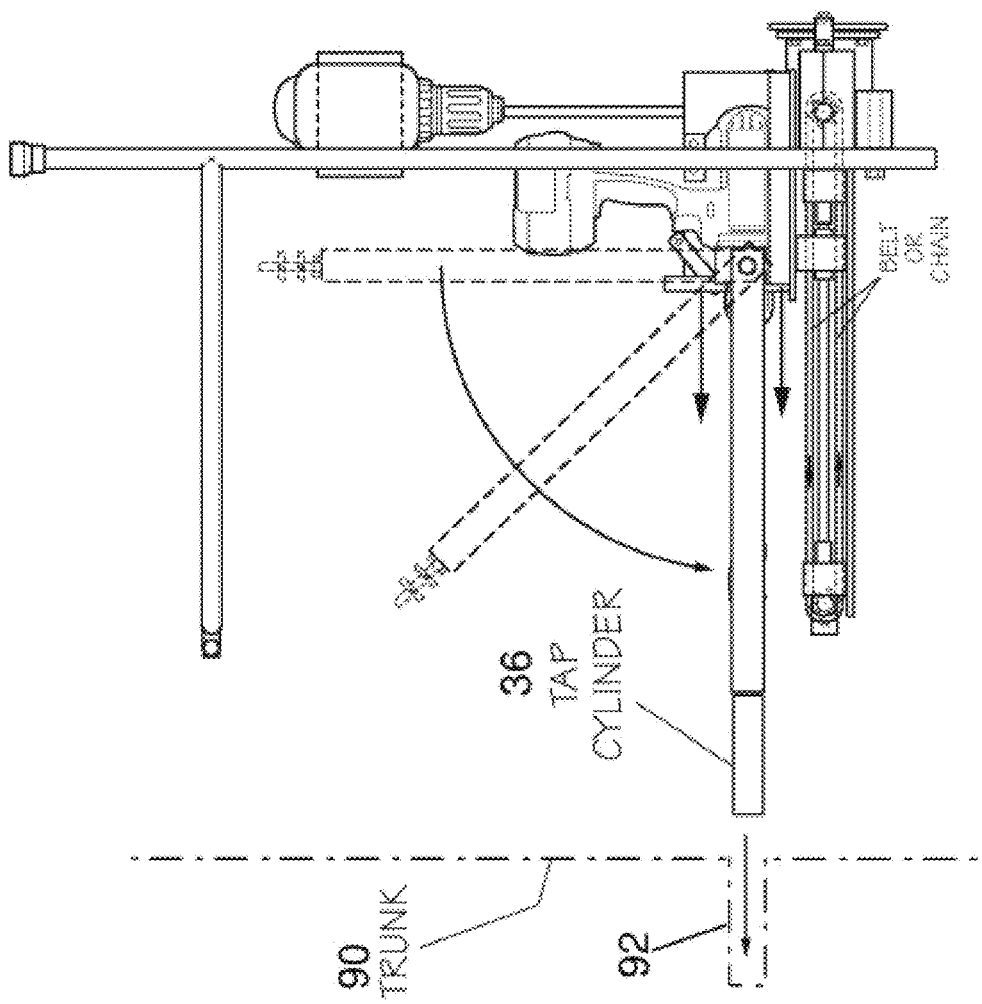

US 9,848,541 B2

APPARATUS FOR TAPPING TREES

PRIORITY CLAIM

This application claims benefit of U.S. provisional patent application No. 61/844,872 filed on Jul. 11, 2013.

BACKGROUND OF THE INVENTION

1. Field of the Invention

The present invention relates to tapping trees and particularly to an improved mobile apparatus for drilling taps and inserting tap cylinders to tap trees.

2. Discussion of the Prior Art

Drilling and tapping trees for turpentine in forests is time consuming and labor intensive. The area for work is confined because of the remote location and density of multiple trees within forested farms where turpentine is obtained. Equipment that can be used in these forested areas without requiring great amounts of human labor is not readily available. Previous attempts to improve drilling and tapping of trees to reduce labor and time required have been made using portable drills in connection with gasoline powered machines that are carried on a person's back. For example, U.S. Pat. No. 2,434,089 to H. E. Allen show a portable drill tree tapping machine with a plate carried on a user's back by straps. The backpack plate includes an attached support for a motor and fuel source for driving a drill. The motor drives the drill through a flexible drive shaft, and the drill is removed to drill a suitable hole in a tree. U.S. Pat. No. 2,563,195 to R. L. Soule et al. is very similar and includes a power plant with a gasoline engine attached to the shelf of a back support. The drill is driven by a flexible shaft.

In these above examples and other apparatus for tree tapping today, the person using the machine is required to manually hold the drilling bit against the trunk of the tree being tapped. For insertion of a tap at a preferred height of 6 inches above the ground, these machines require bending over. It's noteworthy that while this process is taking place, the person is carrying a heavy load with a machine on his or her back usually having a fuel tank and a running motor. In addition to drilling the hole for the tap, the tap consisting of a short pipe for syrup or sap to flow through must be inserted into the hole that is made. One can easily understand that after only a few trees, the person handling this labor will become tired and may suffer physical discomfort after a day of such heavy labor. Thus, an ongoing need exists for an improved method or apparatus for tapping trees that will reduce the labor and time required at a reasonable cost.

SUMMARY OF THE INVENTION

The present invention provides an improved apparatus for tapping trees that drills and installs a tap about six inches from the ground. The apparatus is easily moved from tree to tree and does not require any bending over by the operator. Once the apparatus is positioned against a tree and supported by a horizontal support member bearing against a portion of the tree, the operator uses a switch to assert a horizontal movable drill bit against the trunk of a tree and activates the bit to drill a hole. Once the hole is drilled in the tree, the operator adjusts the apparatus for installation of a tap by moving a tap pipe into horizontal position in alignment with the position where the bit drilled the hole. The operator then uses a switch to assert the tap pipe held by the apparatus into the hole that was previously drilled. The apparatus is moved from tree to tree repeating this process for drilling the tree and insertion of each tap. At least 50 trees per hour can be tapped using the apparatus, and the apparatus can be used continuously through a full 8-hour day of labor without causing excess operator fatigue or discomfort.

An object of the present invention is to provide an improved apparatus for tapping trees that saves time and reduces physical labor.

Another object of the present invention is to provide an improved apparatus rests against a tree and supports the drill for drilling a hole for a tap.

Another object of the invention is to position the apparatus against a tree at an angle of 10 degrees from vertical so that a tap can be inserted at a desired position and angle.

Yet another object is to provide an apparatus that drills a tap in a tree at a desired height of about 6 inches from the ground.

Still another object is to provide an apparatus that installs a tap pipe into a hole that is drilled by the apparatus.

And still another object is to provide an improved apparatus that can drill and install a tap in a tree for obtaining sap, latex or resin for production of turpentine, rubber, syrups and other substances.

These and other objects of the invention will be apparent to those skilled in the art.

BRIEF DESCRIPTION OF THE DRAWINGS

FIG. 1 is a perspective view of an apparatus for tapping trees in accordance with the present invention.

FIG. 2 is a front plan view of a section of the apparatus for tapping trees of FIG. 1.

FIG. 4A is a side plan view of the apparatus of FIG. 1 with the tap cylinder shown on the apparatus positioned for insertion into the bore of the tree trunk.

FIG. 4B is a side plan view of a section of the apparatus of FIG. 4A showing the tap cylinder inserted into the bore of the tree trunk.

DETAILED DESCRIPTION OF THE INVENTION

Figure 3B:
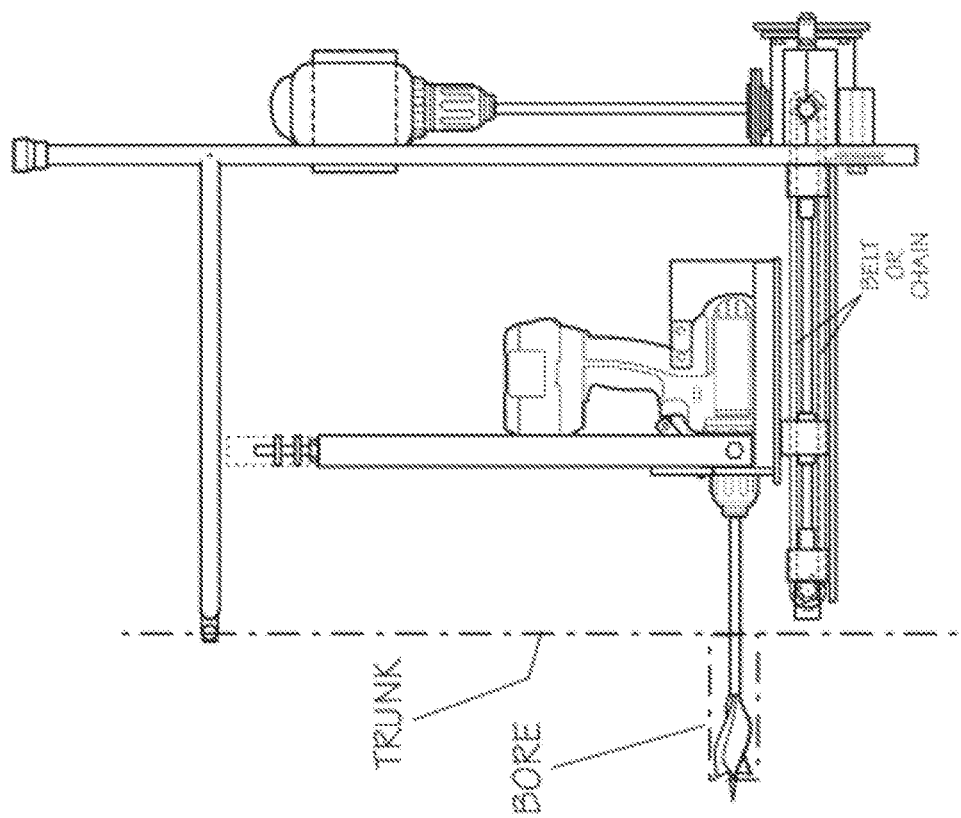
FIG. 3B is a side plan view of the apparatus of FIG. 1 with the drill bit shown within a bore having drilled a hole in the tree trunk.

Referring now to the drawings, FIG. 1 illustrates an apparatus for tapping trees in accordance with an embodiment of the invention. The apparatus includes a vertical support structure providing a tower for the apparatus that is vertically oriented during the tree tapping process. The vertical support structure 10 supports horizontally attached structures attached at right angles to the vertical line of the vertical support structure. The vertical support structure 10 is situated at about a right angle to the horizon when placed upright and provides the upright tower supporting the horizontal features of the apparatus. Separate horizontal structures are attached on an upper portion of the vertical support structure 10 and a lower portion of the vertical support structure.

The horizontal structures are attached to the vertical support structure about parallel to or in the plane of the horizon of the ground. An upper horizontal member 12 of the horizontal structures is shown in FIG. 1 attached in the upper portion of the vertical support structure 10. As shown, the vertical support structure includes a pair of parallel vertical posts including a first vertical post 16 and a second vertical post 18. The upper horizontal member 12 shown includes a pair of parallel horizontal beams 20a, 20b attached perpendicular to the respective vertical posts 16, 18. The pair of horizontal beams includes the first horizontal beam 20a and the second horizontal beam 20b welded at the first end of the horizontal member to the respective vertical post to which the horizontal beams are attached. The upper horizontal member 12 extends from the vertical support structure 10 toward a tree trunk 90 when the apparatus is used and terminates in a second end of the upper horizontal member that is distal and terminal from the first end of the upper horizontal member 12.

The second end of the upper horizontal member 12 may lean against the tree trunk 90 during operation of the apparatus. FIG. 1 illustrates a crossbar 22 on the second end that provides structural integrity for the upper horizontal member 12 as well as a weight bearing member for support against a tree or trunk 90. A curved bar 24 is attached to the crossbar 22 to shape the second end of the upper horizontal member 12 to the contour of the tree, thereby providing ample support of the load of the apparatus against the surface of the tree.

With regard to the vertical support structure 10, a first end 26 of the vertical posts extends upward beyond the upper horizontal member 12 and terminates to provide a handle for movement and adjustment of the apparatus. The first end 26 of each vertical post 16, 18 is capped for safety and ergonomics and the vertical posts may be accessorized with additional ergonomic or supporting features. The vertical support structure 10 in the exemplary embodiment of FIG. 1 includes a second end 28 of the vertical posts 16, 18 that extends downward beyond a lower horizontal member 14 attached near the lower portion of the vertical support structure. The second end 28 of the vertical posts terminates below the lower horizontal member 14. The second ends of the vertical posts function as feet for engagement with the ground while the apparatus is stood against the tree trunk 90. The second end 28 of the vertical posts 16, 18 may be accessorized with additional supporting features to provide secure footing or transport features such as wheels.

The lower horizontal member 14 supports a drill block 30 with drill 32 used to bore a hole 40 during tapping of trees and also provides support for a tap press 34 for insertion of a tap cylinder 36 comprising a tap pipe, tube, spile, spigot or the like. In the embodiment shown, the support structure of the lower horizontal member 14 includes a bottom support plate 38, front block 40 and rear block 42, travel rods 44, and the drill block 30. The drill block 30 holds the drill 32 mounted thereon and the tap press 34, which is shown attached to the drill block.

The bottom support plate 38 of the lower horizontal member 14 attaches to the vertical support structure 10. As shown, the vertical support structure includes a cross-member 46 attached by welding between the vertical posts 16, 18. The bottom support plate 38 is bolted or welded to the cross-member 46 and extends outward at a right angle from the vertical support structure 10. The rear block 42 is mounted to the cross-member 46 and bottom support plate 38 between the vertical posts. The rear block 42 includes a channel 48 for receiving a drive chain 50 and includes a shaft 52 running through a hole in the rear block and rotating a first sprocket 54. The travel rods 44 extend horizontally outward from the rear block 42 and terminate at the front block 40. The front block is distally separated from the rear block and mounted on the opposite end of the bottom support plate 38 from the rear block. The front block 40 also includes a channel 56 for receiving the drive chain 50 and includes a rotating second sprocket 58 within the front block supporting the drive chain for movement thereof.

Figure 3A:
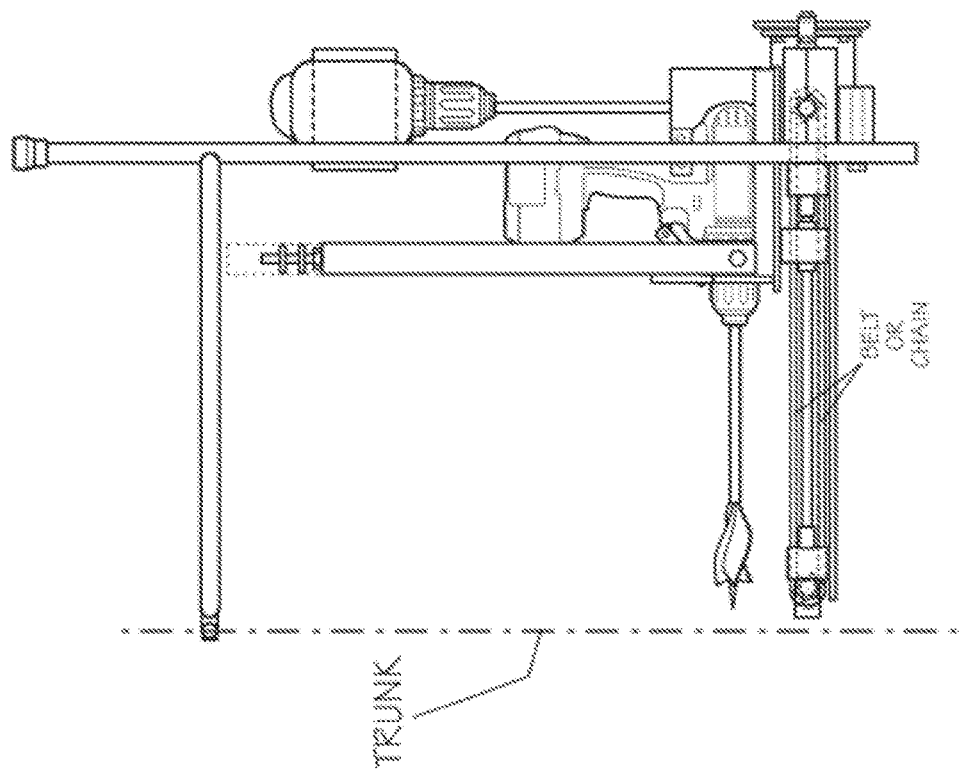
FIG. 3A is a side plan view of the apparatus of FIG. 1 with the drill bit positioned for drilling a hole in a tree trunk.

The drive chain 50 is attached to the drill block 30 by a suspension member 60 shown in FIG. 2 that includes holes 62 receiving the travel rods 44. The holes 62 in the suspension member include bearings for movement of the suspension member 60 horizontally along the travel rods 44. The drive chain 50 is received within opposing channels 64 in the suspension member 60, and the chain is engaged or attached to the suspension member by any suitable attachment device 66 so that the chain will drive the movement thereof. The suspension member 60 supports the remainder of the drill block 30 on the travel rods 44, whereby the drill block is driven by the drive chain 50 horizontally during operation as the suspension member moves along the travel rods. In a first position, the drill block 30 is pulled inward and retracted rearward with the suspension member 60 situated close to the rear block 42. In a second position, the drill block 30 is pushed outward or forwards from the vertical support structure 10, or otherwise extended, with the suspension member 60 situated closer to the front block 40. These relative positions are shown in more detail in FIG. 3A showing the first position of the drill block 30 and FIG. 3B showing the second position of the drill block.

The drill block 30 supports the drill 32 and positions a bit 68 horizontally for drilling into a tree trunk 90 as the drill block is pushed from the first position to the second position. The embodiment shown includes a battery powered drill 32 mounted within the drill block 30 by a provided base 70, front support 72 for the drill, and side support 74 portions of the drill block. The base 70 and side support 74 of the drill block may be attached to the suspension member 60 by bolts or other means as shown in FIG. 2. Alternatively, the drill block 30 may be customized with a electric motor and a drill with bit integrated into the drill block.

The tap press 34 attaches to the drill block 30 for rotation from a first position to a second position as shown in FIG. 4A. In the embodiment depicted, the tap press 34 includes opposing arms 76 that are attached at their first ends to opposing sides of the drill block 30 by bolts or screws and appropriate washers or bearings to permit rotation of the arms. The second ends of the opposing arms has a crosspiece 78 for support of a male receptacle 80 for receiving a tubular tap cylinder 36 of a tap pipe, tube, spile, spigot or the like. A typical tap cylinder 36 adapted for resin used in production of turpentine has a diameter of about one inch. In the first position, the tap press 34 is situated vertically out of the way of the drill bit 68 for storage of the tap press. In preparation for inserting the tap cylinder 36 into the drilled hole 92 in a tree trunk 90, the tap cylinder is situated upon the male receptacle 80 prior to rotation of the tap press 34 into horizontal position for pressing the tap cylinder into the tree. Upon rotating the tap press 34 downward to the second position, the tap press is situated horizontally with the male receptacle 80 prepared to press the desired tap cylinder 36 device into the hole 92. Upon activating the drive chain to move the drill block forward, the tap cylinder is pressed into the hole 92 of the tree trunk 90 as shown in FIG. 4B. It is preferred in the turpentine industry to insert the tap cylinder 36 at about six inches from the ground into the tree trunk 90. Therefore, the exemplary embodiment is arranged accordingly. However, in other industries, such as maple syrup, it may be desirable to provide the drill block 30 and tap press 34 at a different level or adapted for adjustable height.

The rearward and forward movement of the drill block 30 is operated through a gear box 82 and motor that drives the chain 50. The motor driving the chain is reversible to move the drill block 30 forwards and backwards via the chain. In the embodiment shown, the motor for driving the shaft or gears in the gear box includes a second battery operated drill 84 adapted to hold a downward shaft 86 connected to the gear box 82 for a 90 degree change in the direction of rotation of the shaft. The second drill 84 is shown mounted on the vertical post 16 above the gear box 82 to provide a convenient position for the switch of the second drill to be hand operated without requiring the operator to bend over during operation. As a variation, a switch may be incorporated into the vertical tower of the apparatus and connected to a motor in place of the second drill. The motor driving the forward and rearward movement of the drill block 30 may be incorporated into the drill block to save space or improve the design or cost of manufacture. Where a downward shaft 86 is provided as shown in FIG. 1, the gear box 82 converts the rotation of the downward shaft via the gears to rotate the horizontal shaft 52 in the rear block 42 and cause the sprocket 54 in the rear block to drive the chain 50.

The apparatus is moved into position against a tree trunk 90 by placing the feet of the second ends 28 of the vertical posts on the ground and leaning the curved bar 24 on the crossbar 22 of the second end of the upper horizontal member 12 against the tree trunk. The feet should be situated far enough from the tree trunk to allow the apparatus to lean inward vertically against the trunk at an angle of about 10 degrees. This stabilizes the apparatus and promotes drilling the tap hole 92 into the trunk 90 at a desirable angle. The drill bit 68 engages the tree trunk 90 upon moving the drill block 30 forwards toward the trunk, and, with the apparatus situated as described, the drill bit will drill a hole 92 about six inches deep into the trunk.

I claim:
1. An apparatus for tapping trees comprising:
 a vertical support structure with an upper portion and a lower portion and having vertical posts with a first end and a second end in which the second end engages ground for support of the vertical support structure;
 an upper horizontal member attached to the upper portion of the vertical support at a first end and said upper horizontal member having a second end that is distal from the first end and includes a weight bearing member for support of the apparatus against a tree;
 a lower horizontal member attached to the lower portion of the vertical support structure;
 a drill block including a drill supported by the lower horizontal member via a suspension member that provides horizontal movement of the drill block and the drill inwards and outwards with relation to the vertical support structure.

* * * * *